United States Patent
Yih

(12) 
(10) Patent No.: US 6,314,828 B1
(45) Date of Patent: Nov. 13, 2001

(54) SKEW PANTOGRAPH ROBOTIC APPARATUS

(76) Inventor: Tachung C. Yih, 1329 Lyra La., Arlington, TX (US) 76013

( * ) Notice: Subject to any disclaimer, the term of this patent is extended or adjusted under 35 U.S.C. 154(b) by 0 days.

(21) Appl. No.: 09/553,908

(22) Filed: Apr. 20, 2000

(51) Int. Cl.[7] ................................................. B25J 17/00
(52) U.S. Cl. .................................. 74/490.01; 74/490.05; 901/16; 901/28
(58) Field of Search ........................... 74/490.01, 490.05; 901/15, 16, 18, 27, 28, 41

(56) References Cited

U.S. PATENT DOCUMENTS

| | | |
|---|---|---|
| 4,675,499 | 6/1987 | Nakal . |
| 4,690,327 | * 9/1987 | Takai et al. ............................ 239/226 |
| 5,007,784 | 4/1991 | Genov . |
| 5,131,706 | 7/1992 | Appleberry . |
| 5,222,409 | 6/1993 | Dalakian . |
| 5,536,135 | * 7/1996 | Robertson ............................ 414/728 |
| 5,667,354 | * 9/1997 | Nakazawa ......................... 414/744.5 |
| 6,106,511 | * 8/2000 | Jensen ...................................... 606/1 |
| 6,162,523 | * 12/2000 | Metelski et al. ...................... 428/113 |

FOREIGN PATENT DOCUMENTS 7-276270 * 4/1994 (JP) .

OTHER PUBLICATIONS

J.D. De Vries, 1947.
Edward Kafrissen, Industrial Robots and Robotics (date unknown).
Mechanical Designs of Robots (date unknown).
Fundamentals of Industrial Robots and Robotics, Rex Miller (date unknown).
Robotic Engineering An Integrated Approach Richard D.Klafler (date unknown).
Introduction To Robotics, Phillip John McKenow (date unknown).
Robotics and Manufacturing M. Jamshide (date unknown).

* cited by examiner

*Primary Examiner*—David Fenstermacher
(74) *Attorney, Agent, or Firm*—Arthur F. Zobal; Geoffrey A. Mantooth

(57) ABSTRACT

The apparatus has four links pivotally coupled together. First and second links each includes a first portion having an angular portion extending therefrom at an angle of between 120–135 degrees. The first link is pivotally coupled to the angular portion of the second link; the third link is pivotally coupled to the second link at about the juncture of its angular portion and its first portion; and the fourth link is pivotally coupled to the third link and to the first link at about the juncture of its angular portion and its first portion. The first portion of the second link is employed for holding a tool or a utility device thereto. A first linear actuator is pivotally coupled to the pivotal connection between the third and fourth links and a second linear actuator is pivotally coupled to the angular portion of the first link. The first linear actuator can impart linear movement to the second link in a given direction and the second linear actuator can impart linear movement to the second link in a different direction. The two linear actuators when activated simultaneously can impart a curvilinear trajectory to the second link. The effective length of each of the first and third links between their pivotal connections is equal to R and the effective length of each of the second and fourth links between their pivotal connections is equal to r. The ratio R/r is equal to a magnitude of 3 to 7.

7 Claims, 5 Drawing Sheets

SKEW PANTOGRAPH ROBOTIC APPARATUS

BACKGROUND OF THE INVENTION

1. Field of the Invention

The invention relates to a pantograph robot manipulator.

2. Description of the Prior Art

The known pantograph robot manipulators have four straight links defining a parallelogram. Although these devices are useful, they do not have the movements or the precision desired in some applications.

SUMMARY OF THE INVENTION

It is an object of the invention or base to provide a new and useful skew pantograph robot manipulator that offers advantages of two independent orthogonal straight-line motions, higher payload, higher precision, and sturdier structure. The two orthogonal straight-line motions(e.g. horizontal and vertical) generated by the robot renders more versatile and precise material handling capability. The two straight-line trajectories are controlled by two linear actuators, respectively. While activating the two linear actuators simultaneously, a curvilinear trajectory is enabled. The pantograph structure is a hybrid design of an open-chain robotic system, commonly used in mechanical system design, and a closed-chain mechanism, commonly used in mechanical system design. The advantages of a mechanism-higher payload, higher precision and sturdier structure-are inherited in the manipulator of the invention. The pantograph design magnifies the output motion (output/input>1); that is, a greater range of material handling ability can be produced with the same or even smaller input. It is time and energy efficient throughout the course of operations. Moreover, size of the robot can be reduced with a smaller footprint or base without sacrificing its performance due to this output/input augmentation. The invention can be of immediate industrial application and land based material handling applications such as manufacturing, construction, warehousing, and commercial shipping industry. Moreover, with a desirable precision, this invention is applicable to the development of a surgical robot manipulator.

The apparatus comprises four links pivotally coupled together. First and second links each comprises a first portion having an angular portion extending therefrom at an angle of between 120–135 degrees. The first link is pivotally coupled to the angular portion of the second link; the third link is pivotally coupled to the second link at about the juncture of its angular portion and its first portion; and the fourth link is pivotally coupled to the third link and to the first link, at about the juncture of its angular portion and its first portion. The first portion of the second link comprises means for use for attaching a tool or a utility device thereto. A first linear actuator is pivotally coupled to the pivotal connection between the third and fourth links and a second linear actuator is pivotally coupled to the angular portion of the first link.

The effective length of each of the first and third links between their pivotal connections is equal to R and the effective length of each of the second and fourth links between their pivotal connections is equal to r. The ratio R/r is equal to a magnitude of 3 to 7.

The first linear actuator can impart linear movement to the second link in a given direction and the second linear actuator can impart linear movement to the second link in a different direction. The two linear actuators when activated simultaneously can impart a curvilinear trajectory to the second link.

DESCRIPTION OF THE PREFERRED EMBODIMENTS

Figure 1:
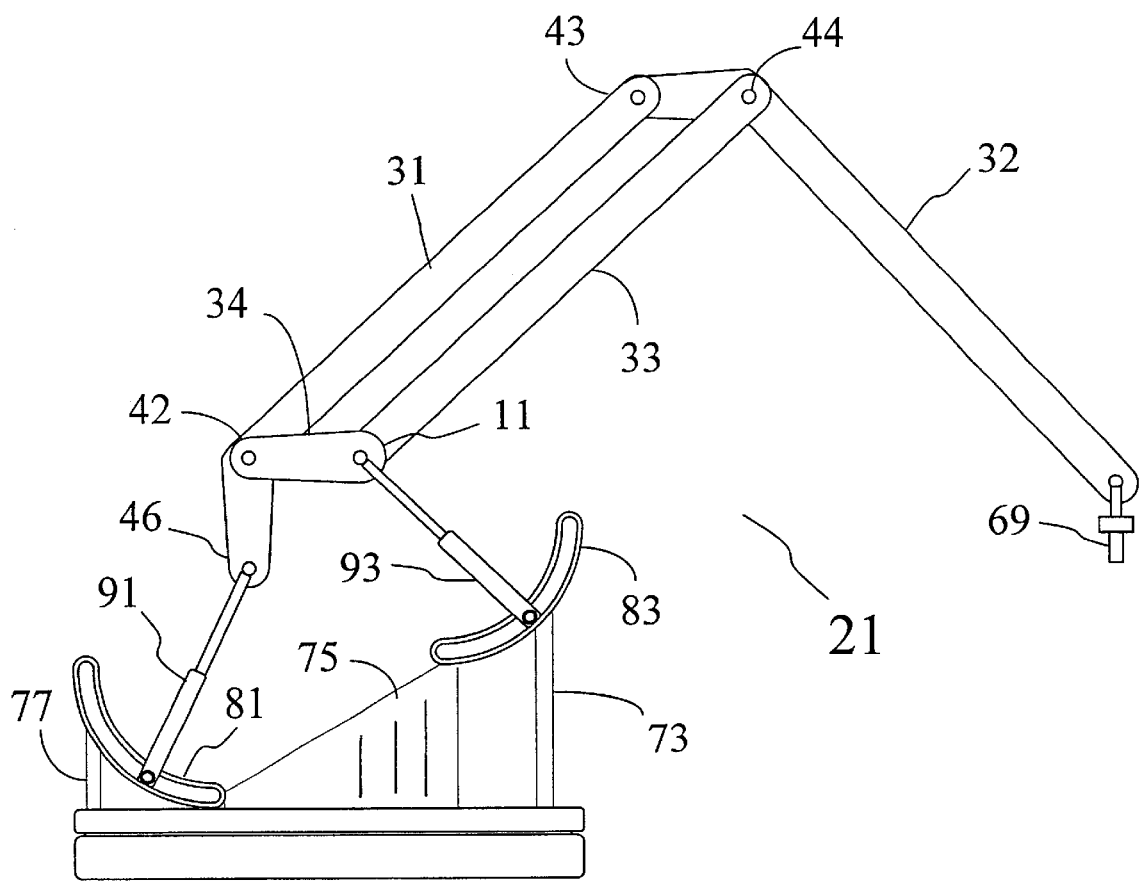
FIG. 1 is a side view of the apparatus of the invention.
Figure 6:
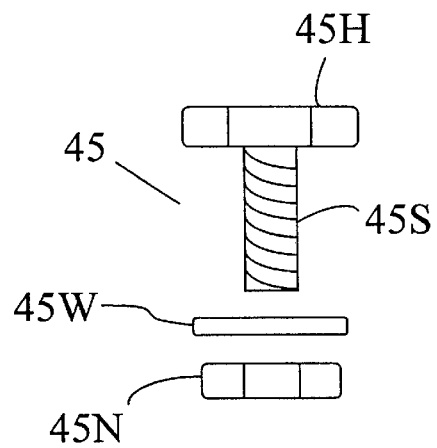
FIG. 6 illustrates a connecting bolt and nut.
Figure 2:
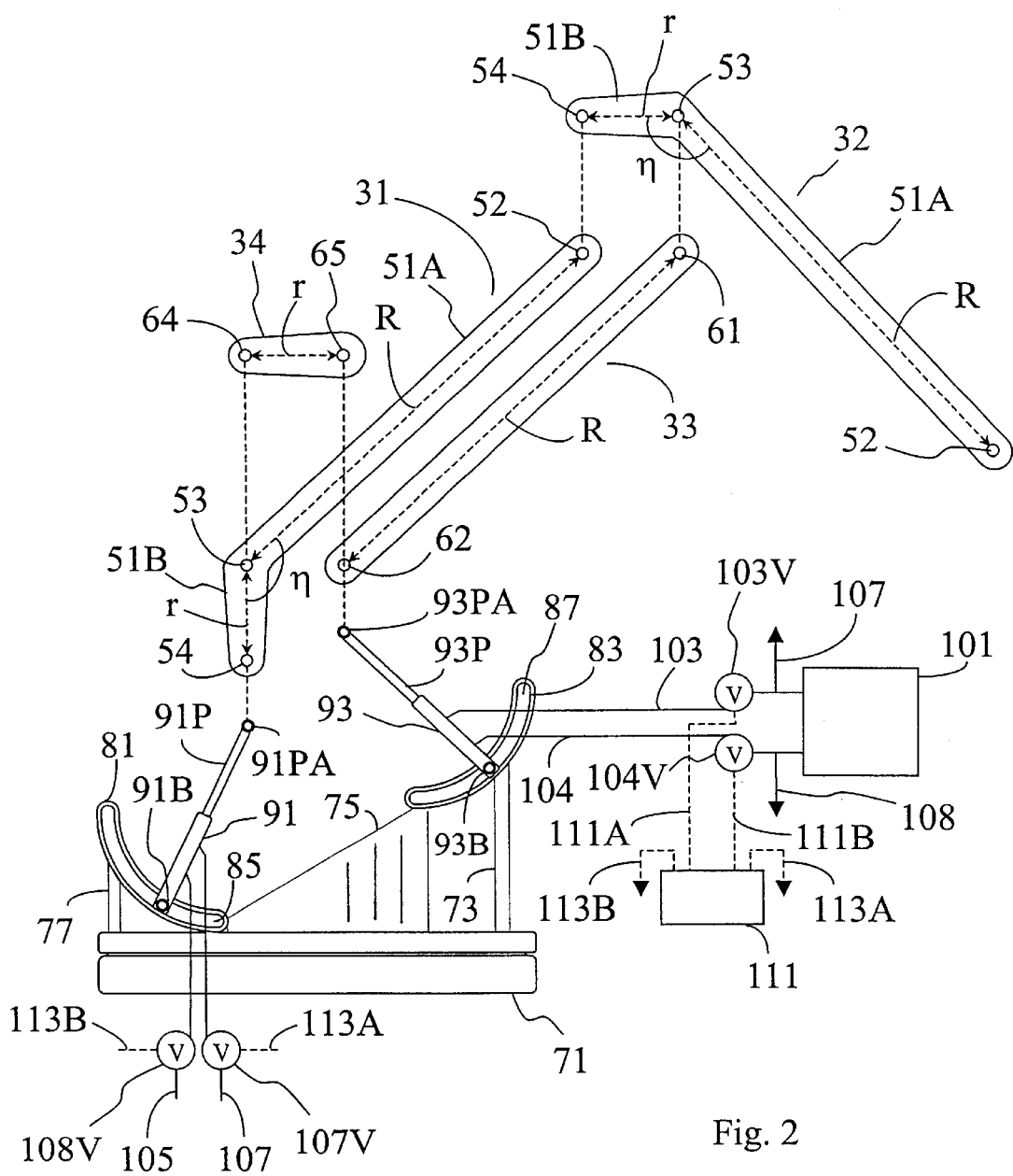
FIG. 2 is a partial exploded view of the apparatus of FIG. 1.

Referring to the drawings, the apparatus of the invention is identified at 21. It comprised four links 31, 32, 33, 34 pivotally coupled together by four pivot members 41, 42, 43, 44 which may be metal bolts held in place by nuts. One such bolt and nut combination is illustrated in FIG. 6 which discloses a bolt 45 having a head 45H, a threaded cylindrical shaft 45S, a washer 45W, and a nut 45N. Link 31 comprises an elongated straight portion 51A with an angular portion 51B extending from one end of the straight portion 51A. Three circular apertures 52, 53, 54 are formed through the link 31 with the aperture 53 being located at about the juncture of portions 51A and 51B. The distance between the centers of apertures 52 and 53 is equal to R and the distance between the centers of apertures 53 and 54 is equal to r. Link 32 is identical to link 31 and the same reference numerals identify the same components as in link 31. The magnitude of the obtuse angle $\eta$ is between 120 degrees and 135 degrees and preferably is equal to 126.87 degrees.

The link 33 is an elongated straight member and has two circular apertures 61 and 62 at its ends with the distance between the centers of the apertures 61 and 62 being equal to R. The link 34 is a short straight member and has two circular apertures 64 and 65 at its ends with the distance between the centers of the apertures 64 and 65 being equal to r.

The links 31, 32, 33, and 34 may be made of a suitable metal such as iron, steel, or aluminum.

The shafts of the four bolts 41, 42, 43, 44 extend respectively through apertures 65 and 62, through apertures 64 and 53, through apertures 54 and 52, and through apertures 53 and 61 to pivotally couple together links 33 and 34, links 31 and 34, links 31 and 32, and links 32 and 33. The members 41, 42, 43, 44 are held in place by the washers and nuts.

A tool 69 is coupled to the link 32 by way of the aperture 52 of the link 32.

A support base 71 is provided having upward extending posts 73, 75, 77 attached thereto and to two arcuate support members 81 and 83 having arcuate slots 85 and 87. Two linear actuators comprising two hydraulic or pneumatic cylinders 91 and 93 having pistons 91P and 93P which are secured to the members 81 and 83 by bolts 91B and 93B at desired stationary positions along the slots. The cylinders 91 and 93 can be secured to the members 81 and 83 at different angular or arcuate positions along the slots 85 and 87. The pistons 91P and 93P have apertures 91PA and 93PA at their ends. The bolt 41 which extends through apertures 64, 65 also extends through aperture 93PA of the piston 93 and pivotally couples links 34, 33, and piston 93P together. A separate bolt 46 extends through aperture 54 and piston aperture 91PA to pivotally couple the piston 91P to the angular portion 51B of the link 31.

A source 101 of hydraulic fluid or air under pressure is coupled to the cylinder 93 by way of conduits 103, 104 having electrically controlled valves 103V 104V. The source 101 also is coupled to the cylinder 91 by way of conduits 107, 108 having electrically controlled valves 107V and 108V. An electrical control system 111 is coupled to the valves 103V, 104V by way of electrical leads 111A, 111B and to the valves 107V, 108V by way of electrical leads 113A, 113B. The control system 111 can control the valve pairs 103V, 104V and 107V, 108V, separately to move the piston 91P linearly in or out of its cylinder or the piston 93P linearly in or out of its cylinder or simultaneously to move both pistons 91P, 93P. The pistons 91P, 93P when actuated separately, impart linear movement to the pivot member 46 or to pivot member 41 and hence to the link 32.

The pistons 91P and 93P when actuated simultaneously, impart curvilinear movement to the link 32.

The two linear actuators may be two jack screws instead of the two cylinders 91 and 93 coupled to the accurate supports 81 and 83 with suitable control means.

Figure 3:
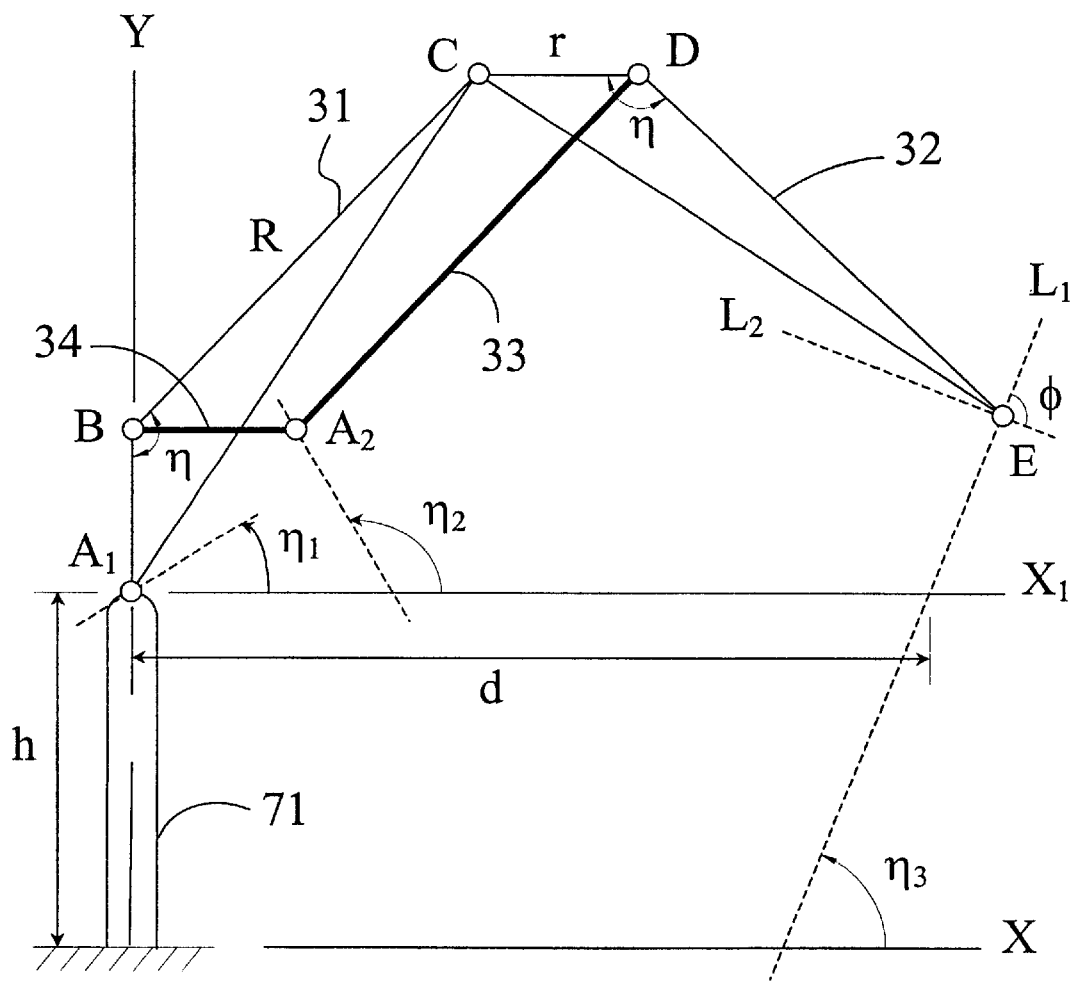
FIG. 3 is a line drawing of the apparatus of FIG. 1.
Figure 4:
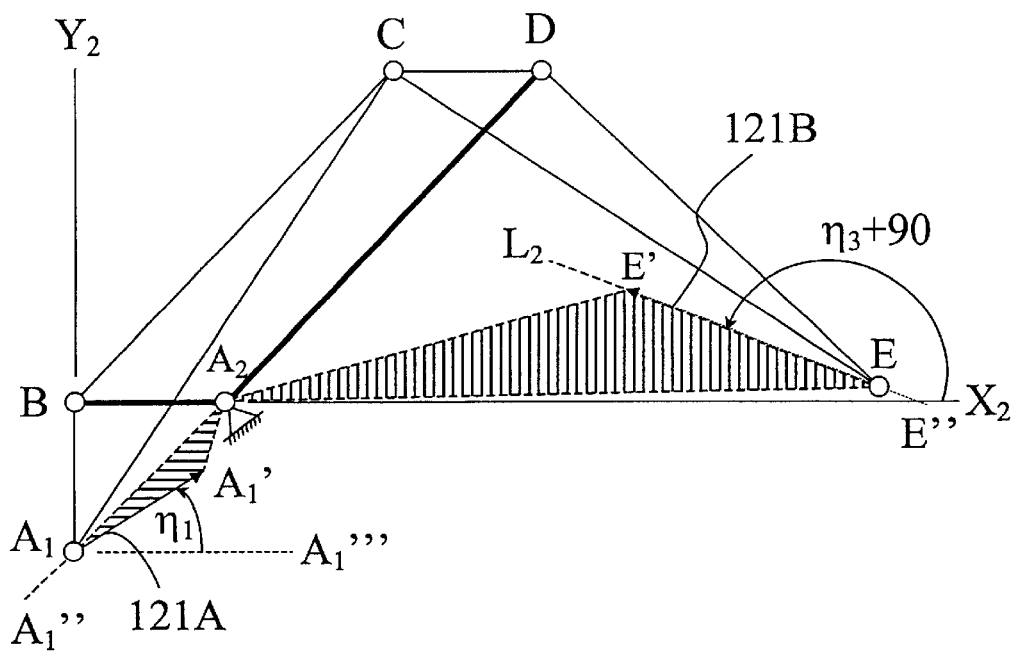
FIG. 4 is a line drawing of the apparatus of FIG. 1 illustrating the generation of a straight line trajectory by actuating joint A1.
Figure 5:
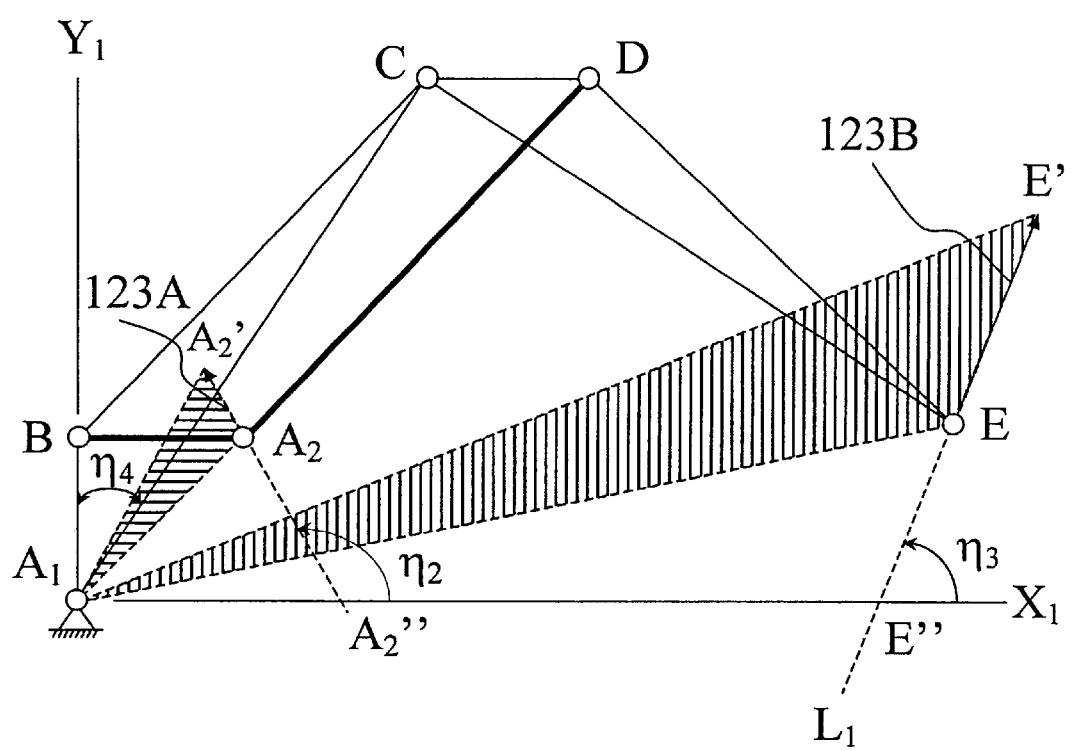
FIG. 5 is a line drawing of the apparatus of FIG. 1 illustrating the generation of a straight line trajectory by actuating joint A2.

In FIG. 3, the base 71 is illustrated in FIGS. 3, 4, and 5 the two linear actuators are not illustrated in detail.

Referring to FIGS. 3, 4, and 5, the links 31, 32, 33, and 34 are depicted by lines and the pivot points 41, 42, 43, and 44 are depicted by joints $A_2$, B, C, and D respectively. The tool 69 will be located at point E. A straight-line motion $L_1$ can be generated in a designated direction defined by angle $\eta_3$ by linearly activating or moving joint $A_2$ in a direction defined by angle $\eta_2$, with joint $A_1$ held stationary. In a similar manner, a straight-line motion $L_2$ is produced by linearly activating or moving joint $A_1$ in a direction defined by angle $\eta_1$ with joint $A_2$ held stationary. When joints $A_1$ and $A_2$ are moved simultaneously linearly in directions defined by $\eta_1$ and $\eta_2$, the point E will moved in a curved or curvilinear trajectory. With properly controlled $\eta_1$ and $\eta_2$ angles, the intersection of lines $L_1$ and $L_2$ will always be perpendicular such that the angle $\phi$ will be equal to 90 degrees. This robotic apparatus is capable of producing two orthogonal straight-line motions in any direction; that is, maintaining $\phi$ at 90 degrees with $\eta_3$ covering a range from 0 degree to 90 degrees. For a skew pantograph robotic apparatus, the above conditions can be achieved only when $\eta$=126.87 degrees and R/r equals 5. Also the length of the path of point E will be magnified compared to the movement of joints $A_1$ or $A_2$. This is shown by the arrows 121A and 121B of FIG. 4 and by the arrows 123A and 123B of FIG. 5. In this respect as shown in FIG. 4, when $A_1$ is moved to $A_1'$. E is moved to E' and as shown in FIG. 5, when $A_2$ is moved to $A_2'$, E is moved to E'. If the length of link 32 is shorter, magnification will occur but the magnification rate will be reduced.

Good results can also be obtained if the angle $\eta$ is not exactly equal to 126.87 degrees but is within the range of 120 degrees and 135 degrees and if the magnitude of R/r is not exactly equal to 5 but is within the range of 3–7. In this respect, $\phi$ will still be equal to about 90 degrees but the point E cannot be moved in all directions within $0° \leq \eta^3 \leq 90°$.

I claim:

1. An apparatus for operating a tool, comprising:

a first link comprising a first portion with an angular portion extending from said first portion at an angle $\eta$ between 120 degrees and 135 degrees, a second link comprising a first portion with an angular portion extending from said second portion of said second link at said angle $\eta$ between 120 degrees and 135 degrees, a third link, a fourth link, a first pivot means pivotally coupling said third and fourth links together, a second pivot means pivotally coupling said fourth link to said first link at about the juncture of said first portion and said angular portion of said first link, a third pivot means pivotally coupling said first link to said angular portion of said second link, a fourth pivot means pivotally coupling said third link to said second link at about the juncture of said first portion and said angular portion of said second link, the distance between said first and second pivot means being about equal to the distance between said third and fourth pivot means, the distance between said first and fourth pivot means being about equal to the distance between said second and third pivot means, said four links pivotally coupled together by said first, second, third, and fourth, pivot means define a parallelogram between said four pivot means, said first portion of said second link comprising means for use for coupling a tool thereto, first support means pivotally coupled to said first pivot means for moving said first pivot means and hence said second link to different positions, second support means pivotally coupled to said angular portion of said first link for moving said angular portion of said first link and hence said second link to different positions.

2. The apparatus of claim 1, wherein:

the distance between said first and fourth pivot means and hence between said second and third pivot means is equal to R, the distance between said first and second pivot means and hence between said between said third and fourth pivot means is equal to r, the ratio of R/r is equal to a magnitude in the range of 3 to 7.

3. The apparatus of claim 1, wherein:

said angle $\eta$ is equal to about 126.87 degrees.

4. The apparatus of claim 2, wherein:

said ratio R/r is equal to a magnitude of about 5.

5. The apparatus of claim 3, wherein:

said ratio R/r is equal to a magnitude of about 5.

6. The apparatus of claim 1, wherein:

said first support means comprises first linear activating means for moving said first pivot means linearly in a given direction.

said second support means comprises second linear activating means for moving said first link linearly in a given direction.

7. The apparatus of claim 6, comprising:

means for supporting said first linear activating means in different positions and orientations, and means for supporting said second linear activating means in different positions and orientations.

* * * * *